US012688777B2

(12) United States Patent
Chow et al.

(10) Patent No.: US 12,688,777 B2
(45) Date of Patent: Jul. 21, 2026

(54) VEHICLE POSE CORRECTION BY INTER-VEHICLE COMMUNICATION

(71) Applicant: Zoox, Inc., Foster City, CA (US)

(72) Inventors: Siu Fai Chow, San Jose, CA (US); Till Kroeger, Chicago, IL (US); Mengping Zhu, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 42 days.

(21) Appl. No.: 18/961,348

(22) Filed: Nov. 26, 2024

(65) Prior Publication Data

US 2026/0148640 A1 May 28, 2026

(51) Int. Cl.
*G08G 1/16* (2006.01)
*G08G 1/00* (2006.01)

(52) U.S. Cl.
CPC ............... *G08G 1/166* (2013.01); *G08G 1/22* (2013.01)

(58) Field of Classification Search
CPC ................................. G08G 1/166; G08G 1/22
See application file for complete search history.

(56) References Cited

U.S. PATENT DOCUMENTS 9,852,554 B2 * 12/2017 Nix ........................ G08G 1/166
10,497,263 B2 * 12/2019 Oh ........................ B60W 30/12
10,518,772 B2 12/2019 Tezuka
10,558,224 B1 2/2020 Lin et al.
10,983,199 B2 4/2021 Adams et al.
11,538,185 B2 12/2022 Kaiser et al.
11,829,156 B2 * 11/2023 Cox ..................... G05D 1/0291
RE49,746 E * 12/2023 Koo ....................... G06V 20/58
12,012,126 B2 6/2024 Kaiser et al.
12,359,921 B2 * 7/2025 Kiyohara ............... G01C 21/28
12,516,939 B2 * 1/2026 Higuchi ............... G01C 21/165
2013/0093618 A1 * 4/2013 Oh .......................... G01S 19/45 342/357.44
2018/0203130 A1 7/2018 Neubecker et al.
2023/0288211 A1 9/2023 Bernd et al.
2024/0183684 A1 6/2024 Arnicar et al.
2024/0294177 A1 * 9/2024 Stählin .................. G08G 1/166

FOREIGN PATENT DOCUMENTS

CN 116908894 A 10/2023
JP H07248382 A 9/1995

OTHER PUBLICATIONS

Search Report and Written Opinion for International Application No. PCT/US25/53407, dated Mar. 17, 2026, 13 pages.

* cited by examiner

*Primary Examiner* — John A Tweel, Jr.
(74) *Attorney, Agent, or Firm* — Lee & Hayes, P.C.

(57) ABSTRACT

Techniques for determining location data usable to control a vehicle in an environment are discussed herein. A computing device can determine a position and/or pose of an autonomous vehicle based on an inter-vehicle communication with another autonomous vehicle from a fleet of autonomous vehicles. The autonomous vehicle can receive pose information and drive time data associated with the other autonomous vehicle for determining a current pose. The techniques can also include adjusting a predicted pose of the autonomous vehicle based on the pose information and the drive time data.

20 Claims, 6 Drawing Sheets

100

VEHICLE POSE CORRECTION BY INTER-VEHICLE COMMUNICATION

BACKGROUND

Machine learned models can be employed to predict an action for a variety of robotic devices. For instance, planning systems in autonomous and semi-autonomous vehicles determine actions for a vehicle to take in an operating environment. Actions for a vehicle may be determined based in part on avoiding objects present in the environment. For example, an action may be generated to yield to a pedestrian, to change a lane to avoid another vehicle in the road, or the like. Accurately predicting actions for the vehicle to operate in the environment enables the vehicle to safely operate in the vicinity of the objects.

Actions for a vehicle to operate in an environment may be predicted based on the vehicle estimating its location in the environment. Accuracy of the location estimated by the vehicle can vary over time and degrade the longer the vehicle operates. For example, a deviation between an actual vehicle location and the location estimated by the vehicle can increase over time. The deviation between the actual vehicle location and the estimated location made by the vehicle reduces accuracy and safety of the predicted actions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
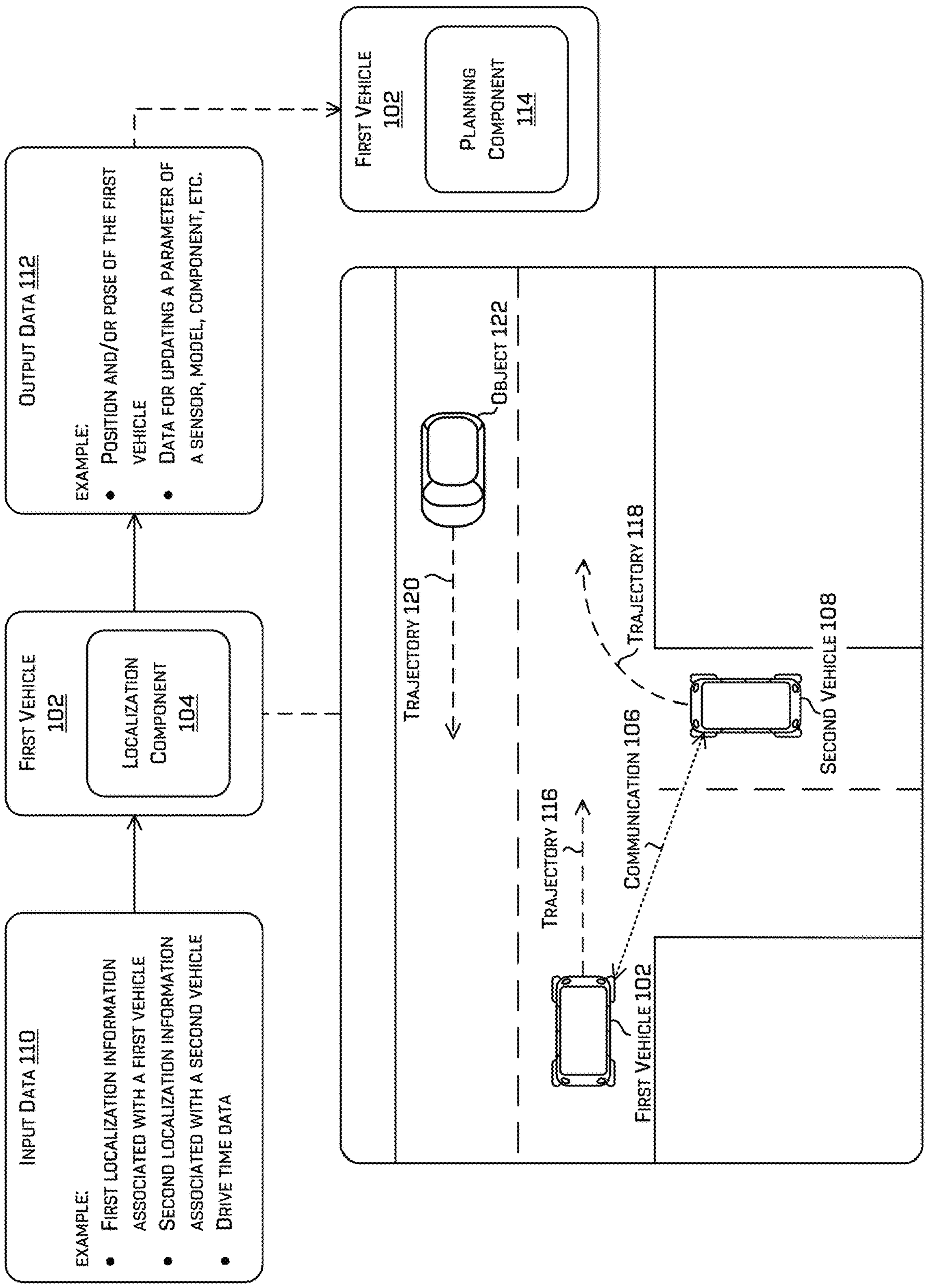
FIG. 1 is an illustration of an example environment, in which an example vehicle applies a localization component to determine location data based on inter-vehicle communication.

This application relates to techniques for determining location data for a robotic device in an environment. For example, a computing device can implement a localization component to determine a position, an orientation, and/or pose of an autonomous vehicle in a real-world environment. In some examples, the localization component can correct pose determinations over time based on an inter-vehicle communication with another autonomous vehicle from a fleet of autonomous vehicles. The autonomous vehicle can receive data as part of the inter-vehicle communication that enables the autonomous vehicle to correct a current pose (e.g., position and orientation) independent of requiring data from a global positioning system (GPS). In some examples, the autonomous vehicle can receive pose information and attributes (e.g., drive time data, map data, etc.) associated with the other autonomous vehicle for correcting, modifying, or adjusting the current pose. Using the techniques described herein, an autonomous vehicle can determine an accurate pose that is usable by the autonomous vehicle during planning operations to quickly and/or preemptively avoid objects, thereby improving safety of the vehicle.

In various examples, a first vehicle and a second vehicle associated with a same fleet of vehicles can include respective communication components for transmitting (e.g., sending and/or receiving) data between the vehicles. For example, the first vehicle can receive a message from a second vehicle indicating a drive time (e.g., a length of time that the second vehicle has been deployed or otherwise navigated in the environment) and/or location data (e.g., a pose, position, etc.) of the second vehicle, though other data may also or instead be included in the message. The first vehicle can input data associated with the message from the second vehicle into the localization component to determine location data of the first vehicle.

Data from another vehicle in a fleet may, for example, correct a prediction of a vehicle based on the vehicle receiving a variety of different types of data. The vehicle may receive attribute data indicating one or more attributes of the other vehicle such as a drive time of the other vehicle and processed sensor data for comparing with the prediction. The vehicle may also or instead receive a score indicating a level of confidence in the processed sensor data (e.g., accuracy of a determined pose, position, etc.). In examples when the vehicle predicts its position at a current time, position data from the other vehicle indicating the other vehicle's position, the vehicle's position, and/or a drive time can be processed by the vehicle to correct the predicted position. The corrected position may be "fine-tuned" by a GPS signal, or other location system data. As a result, the vehicle can generate more accurate predictions which in turn are available for a vehicle computing device to predict more accurate vehicle trajectories (e.g., of the vehicle and the other vehicle). In examples when data from a GPS or other position data relative to a fixed reference system (e.g., a global coordinate system, or the like) is available, the techniques can include determining a weight to correct the global position data based on data exchanged as an inter-vehicle communication. Additional details of sharing data between vehicles is described in U.S. patent application Ser. No. 15/673,728, filed on Sep. 14, 2017, entitled "Shared Vehicle Obstacle Data," which is incorporated herein by reference in its entirety and for all purposes. Additional details of sharing data between robots such as autonomous vehicles is described in U.S. patent application Ser. No. 18/060,825, filed on Dec. 1, 2022, entitled "Using Robot Observations," which is incorporated herein by reference in its entirety and for all purposes.

In some examples, a vehicle computing device of the first vehicle can determine a first drive time of the first vehicle and a current pose of the first vehicle based on sensor data of a sensor(s) coupled to the first vehicle. The current pose of the first vehicle determined from the sensor data may deviate from an actual pose of the first vehicle due to a length of time that the first vehicle has navigated in the environment, a length of time that the vehicle computing device has operated, degradation to a sensor over time, etc. In examples when a first drive time of the first vehicle is greater than a second drive time of the second vehicle, data from the second vehicle can be used to modify the current pose of the first vehicle to compensate for the deviation from the actual pose. However, in some examples attribute data can be used to correct a pose or other prediction by the vehicle independent of receiving drive time information (e.g., based on a confidence of a prediction by another vehicle that had a longer drive time but corrected a prediction using a local landmark, map data from another vehicle, etc.). Using the techniques described herein, the vehicle computing device of the first vehicle can implement the localization component to determine a pose of the first vehicle based on comparing the first drive time of the first vehicle to a second drive time of the second vehicle, and updating the current pose of the first vehicle based on the location data received from the second vehicle.

In some examples, the vehicle computing device of a first vehicle can include a communication component to receive a message from a second vehicle. For example, the first vehicle can detect the second vehicle based at least in part on sensor data associated with the first vehicle. Based on detecting the second vehicle (e.g., within a threshold distance of the first vehicle), the communication component can initiate a first message requesting data from the second vehicle and receive a second message that includes the requested data. In various examples, the second message can include location data such as a pose, position, orientation, or other location information of the second vehicle that is based on sensor data associated with a sensor(s) coupled to the second vehicle. In some examples, a sensor in the environment (e.g., a fixed sensor) can detect that the first vehicle is proximate the second vehicle and initiate an exchange of data between the respective vehicles (and in some examples provide data to one or both of the vehicles).

As described herein, a drive time can include a period of time that a vehicle has been deployed or otherwise been navigating in an environment. For example, a vehicle computing device of the vehicle can be calibrated at various time intervals, and the drive time can represent a period of time from a most recent calibration. In some examples, the vehicle can undergo a variety of tests during calibration to cause the sensors of the vehicle to operate free of errors that are introduced as the vehicle navigates or otherwise operates in the environment. For example, the vehicle computing device can estimate a level of degradation of a sensor and process data from another vehicle to correct the degradation of the sensor.

As described herein, navigating in the environment can include, for example, the vehicle performing various actions such as an acceleration action, a stop action, a brake action, a turn action, or the like. Deployment of a vehicle can represent a time from which one or more tests have been performed to test operation of a model, component, or sensor, for example.

By way of example and not limitation, the localization component of a first vehicle can determine a predicted location of a second vehicle based on first sensor data from one or more sensors coupled to the first vehicle, and receive a location of the second vehicle based on first second sensor data from one or more sensors coupled to the second vehicle. The localization component can determine a difference between the predicted location of the second vehicle (determined by the first vehicle) and the location of the second vehicle received as part of a message from the second vehicle. In examples, the localization component can determine a first weight based on a first attribute or first set of attributes (e.g., a first drive time) of first vehicle and a second weight based on a second attribute of second set of attributes (e.g., a second drive time) of the second vehicle. In various examples, the localization component can determine current location data (e.g., a current pose, position, etc.) of the first vehicle based on the difference, the first weight, and the second weight. Additional description of the localization component can be found throughout this disclosure including in FIGS. 1-3 below.

As mentioned, the first vehicle and the second vehicle can be associated with a fleet of vehicles, such as a fleet of autonomous vehicles that generate respective pose information based on sensor data of sensors coupled to each respective autonomous vehicle. The second vehicle can, for example, operate in the same environment as the first vehicle and, while navigating to a destination, operate in a vicinity of the first vehicle. The vicinity may represent a threshold distance, a line of sight, etc. The first vehicle and the second vehicle can exchange data as part of inter-vehicle communication using a variety of techniques (e.g., near field communication). The exchanged data can indicate, for example, how long the first vehicle and/or the second vehicle have been operating in the environment and may include a variety of predictions by the respective vehicles. Using the techniques described herein, a vehicle having operated for a least amount of time in the environment relative to another vehicle can be leveraged to update, modify, or determine planning data that causes the vehicle to traverse the environment. In one example, the localization component can determine a more accurate pose for a vehicle operating for a greater amount of time than another vehicle by correcting a pose based on the data received from another vehicle that has operated for less time. By using the techniques described herein, data exchanged in an inter-vehicle communication can improve pose estimations, position estimations, etc. for a vehicle which improves subsequent predictions that are based on the pose or position, such as predicting a trajectory that controls the vehicle in the environment.

In some examples, data output by the localization component can be transmitted to another model or component of a vehicle computing device (e.g., a prediction component or a planning component) to determine acceleration, braking, and/or steering actions for the vehicle to follow in the future. For example, a planning component of the vehicle computing device can determine output data representing a position, velocity, acceleration, etc. for one or more objects that can affect the vehicle using the pose, position, etc. associated with the output data.

Though some examples are described in relation to determining a pose or position of a vehicle based on exchanging attribute data for two or more vehicles, relative drive times of two or more vehicles, or the like, data included in an inter-vehicle communication may vary and may be processed in a variety of ways. For example, a vehicle computing device can receive sensor data, or determinations therefrom, from another vehicle in a fleet of vehicles usable for updating a parameter of a sensor (e.g., modifying how a sensor operates) and/or for correcting the determinations of a component or model that are based on sensor data. For instance, a vehicle computing device of a first vehicle can determine a velocity of a second vehicle, receive velocity information from the second vehicle that has a lower relative drive time, and update the determined velocity of the second vehicle. Generally, the vehicle computing device can determine which of two vehicles has more accurate attribute data (e.g., a lower drive time, more accurate map data, more accurate predictions, etc.) and assign a relatively higher weight to data received from the vehicle having the more accurate attribute data. Another weight may be assigned to data from the vehicle having a relatively lower accuracy in determined attribute data (e.g., a relatively higher drive time), and the weights can be used to modify a difference vector representing a difference between determinations of the respective vehicles (e.g., to correct a difference vector associated with a pose, position, velocity, trajectory, and so on).

Data output by the localization component can be used in a variety of ways. For example, output data representing a pose can be transmitted to a computing device (or component thereof) configured to control an autonomous vehicle. For example, a pose generated based on data in an inter-vehicle communication can be transmitted to a planning component of a vehicle computing device that is configured to determine planning data (e.g., a vehicle trajectory, an object trajectory, an output by a decision tree, etc.). In some examples, the output data by the localization component can be used to perform a simulation, control a vehicle, validate or test performance of a vehicle or component thereof, to name a few.

The techniques described herein enable an autonomous vehicle to safely plan for scenarios such as potential interactions with objects (e.g., a vehicle, a pedestrian, a bicyclist, etc.), traffic sign interactions, a lane change, etc. For instance, the vehicle computing device can determine an action (e.g., a braking action, an acceleration action, a trajectory, etc.) for the autonomous vehicle based on an output from the localization component. In some examples, the output data may be used in a decision tree to control the autonomous vehicle by including the pose, position, velocity, etc. as a reference action in a decision tree. The data output by the localization component can improve vehicle planning operations by enabling a more realistic pose, position, etc. to be included in a decision tree that determines reference actions for the vehicle.

In various examples, controlling the vehicle may comprise stopping the vehicle and/or controlling at least one of: a braking system, an acceleration system, or a drive system of the vehicle. Additionally, or alternatively, controlling the vehicle may comprise adjusting a setting or parameter associated with a component or model of a vehicle computing device.

In various examples, aspects of the processing operations may be parallelized and input to a parallel processor unit such as in parallel by a parallel processing unit, a GPU and/or in parallel by multiple GPUs for efficient processing. Accordingly, implementing the techniques described herein can efficiently make use of available computational resources (e.g., memory and/or processor allocation or usage) while also improving accuracy of predictions.

In some examples, a model or component may define processing resources (e.g., processor amount, processor cycles, processor cores, processor location, processor type, and the like) to use to predict location data for a vehicle to use at a future time. For example, a vehicle computing device can implement various models that may have access to different processors (e.g., a parallel processing unit, Central Processing Units (CPUs), Graphics Processing Units (GPUs), Tensor Processing Units (TPUs), multi-core processor, and the like). Models may define processing resources to utilize a processor that most efficiently (e.g., uses the least amount of computational time) outputs a prediction. In some examples, a model may generate a set of action trajectories by processing data associated with the object and/or the vehicle using a CPU, GPU, TPU, or a combination thereof. In this way, the model may be defined to utilize the processing resources that enable the model to perform predictions in the least amount of time (e.g., to use the corrected pose data in planning considerations of the vehicle). Accordingly, a model may make the best use of available processing resources and enable more predictions that may improve how a vehicle navigates in relation to the objects.

As described herein, models may be representative of machine learned models, statistical models, heuristic models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques discussed herein can improve a functioning of a computing device of a vehicle in a number of ways. The computing device may determine an action for the autonomous vehicle to take based on determinations from the localization component. In some examples, a predicted pose, position, etc. using the techniques described herein can enable the autonomous vehicle to consider multiple behaviors or actions that improve safe operation of the autonomous vehicle by accurately characterizing future potential actions with greater detail as compared to previous models. For example, the localization component may determine a pose and/or a position for a vehicle (e.g., by receiving data from another vehicle having a lower relative drive time) that prevents unneeded actions by the vehicle, and/or improves predictions related to the behavior of the vehicle. In some examples, the output data from the localization component can improve functioning and safety of the vehicle by providing data usable for planning operations that causes the vehicle to improve subsequent predictions. In addition, the techniques described herein can improve passenger comfort and/or vehicle safety such as, for example, avoiding sudden braking or swerving when not needed based on using more accurate location data.

The techniques can include the localization component optimizing available computational resources by performing operations that limit an impact on the available resources (as compared to not implementing the component). Utilizing output data from the localization component by a vehicle computing device, for instance, can improve the accuracy and/or reduce a latency for the vehicle to respond to a potential collision in the environment. For example, implementing the localization component can improve safety of a vehicle by efficiently outputting data over time that is usable to determine an optimal planned trajectory for consideration during planning operations.

The techniques discussed herein can also improve functioning of a computing device in a number of additional ways. In some cases, an output by the localization component may allow an autonomous vehicle to generate more accurate and/or safer trajectories for the autonomous vehicle to traverse an environment by relying on the more accurate location data output by the localization component. In at least some examples described herein, a predicted trajectory can be determined with consideration to a more accurate pose yielding safer decision-making by the computing device. These and other improvements to the functioning of the computing device are discussed herein.

In some examples, the techniques can be used in a self-test operation associated with a system to evaluate a performance of the system which provides for greatly improved overall reliability and safety outcomes. Further, the techniques discussed herein may be incorporated into a system that can be validated for safety.

The methods, apparatuses, and systems described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Additionally, the techniques described herein can be used with real data (e.g., captured using sensor(s)), simulated data (e.g., generated by a simulator), or any combination of the two.

FIG. 1 is an illustration of an example environment 100, in which an example vehicle applies a localization component to determine location data based on inter-vehicle communication. For example, a first vehicle 102 can implement a localization component 104 to determine the location data (e.g., a position, an orientation, or a pose) of the first vehicle 102 based on a communication 106 transmitted from a second vehicle 108. As illustrated, the localization component 104 receives input data 110 representing first localization information associated with the first vehicle 102, second localization information associated with the second vehicle 108, and attribute data (e.g., drive time, a time since a last calibration, a level of accuracy associated with a sensor, map data, sensor data, log data, historical data, prediction information such as a localization prediction, etc.) associated with the first vehicle 102 and the second vehicle 108. The output data 112 can represent a position and/or a pose of the first vehicle 102. In some examples, the techniques described herein may be implemented at least partially by or in association with a computing device(s) 202 of FIG. 2A, a vehicle computing device (e.g., vehicle computing device 404 of FIG. 4) and/or a remote computing device (e.g., computing device(s) 436 of FIG. 4).

In some examples, the localization component 104 can send the output data 112 to a planning component 114 for use in planning operations to determine a vehicle trajectory (e.g., a candidate trajectory, a planned trajectory, a predicted trajectory, etc.), or other data, usable to control the first vehicle 102 in the environment 100. As illustrated, the planning component 114 can determine a trajectory 116 (e.g., a candidate trajectory) for the first vehicle 102 to traverse in the environment 100. The planning component 114 may also determine a trajectory 118 (e.g., a predicted trajectory) for the second vehicle 108, and a trajectory 120 (e.g., another predicted trajectory) for an object 122 in the environment 100. By using the location data output by the localization component 104, the planning component 114 can increase accuracy of the trajectory 116, the trajectory 118, and/or the trajectory 120 thereby improving safety and/or comfort of the first vehicle 102 as it traverses in the environment 100.

In some examples, the localization component 104 can receive first localization information indicating location data of the first vehicle 102. The location data can, for example, represent a predicted position and/or a predicted pose of the first vehicle 102 based on sensor data from one or sensors coupled to the first vehicle 102. In various examples, the first vehicle 102 can initiate the communication 106 to receive second localization information indicating location data of the second vehicle 108 based on sensor data from one or more sensors coupled to the second vehicle 108. The communication 106 can also include attribute data (e.g., a drive time, a confidence score for the location data, map data, etc.) for the second vehicle 108 such as a drive time indicating an amount of time that the second vehicle has navigated in the environment 100. Further, the localization component 104 can receive an additional attribute data (e.g., another drive time, confidence score, etc.) for the first vehicle 102 as part of the input data 110. Additional details of determining a location are described in U.S. patent application Ser. No. 15/674,853, filed on Aug. 11, 2017, entitled "Vehicle Sensor Calibration and Localization," and in U.S. patent application Ser. No. 17/119,518, filed on Dec. 11, 2020, entitled "Localization Based On Semantic Objects," which are incorporated herein by reference in their entirety and for all purposes.

A first vehicle computing device associated with the first vehicle 102 can provide the localization component 104 the first localization information and first attribute data (e.g., a first drive time or other data). A second vehicle computing device associated with the second vehicle 108 can provide, as part of the communication 106, the localization component 104 the second localization information and second attribute data (e.g., a second drive time or other data). In some examples, the first vehicle 102 can detect the second vehicle 108 and initiate a request for the communication 106 based on the detection. However, in other examples first vehicle 102 can receive the communication 106 from the second vehicle 108 independent of initiating a request (e.g., the second vehicle 108 can automatically send the communication 106 responsive to being within a threshold distance of another fleet vehicle such as the first vehicle 102, etc.).

By way of example and not limitation, the first vehicle 102 can implement the localization component 104 to determine a difference between the first localization information and the second localization information and/or to compare the first and second attribute data (e.g., drive times, confidence scores, etc.). The first localization information can include a first pose (or position) of the first vehicle 102 and a second pose (or position) of the second vehicle 108 determined by the first vehicle computing device. The second localization information can include a third pose (or position) of the second vehicle 108 determined by the second vehicle computing device. The localization component 104 can, in some examples, determine a difference between the second pose (or position) of the second vehicle 108 determined by the first vehicle computing device and the third pose (or position) of the second vehicle 108 determined by the second vehicle computing device. For instance, the localization component 104 can represent the difference as a difference vector between the second pose and the third pose.

In some examples, the localization component 104 can compare the first drive time and the second drive time to determine which of the first vehicle 102 or the second vehicle 108 has a lower drive time. In examples when the second vehicle 108 has a lower drive time than the first vehicle 102, the localization component 104 can determine a first weight for the first pose of the first vehicle 102, a second weight for the second pose of the second vehicle 108, and/or a third weight for the third pose of the second vehicle 108. The localization component 104 can apply at least some of the weights to the difference vector to determine an amount to adjust or modify the first pose of the first vehicle 102 (e.g., determined by the first vehicle computing device that has operated in the environment 100 longer than the second vehicle computing device). In examples, the localization component 104 can output the modified first pose of the first vehicle 102 as the output data 112.

In some examples, the second vehicle 108 can navigate within a threshold distance of the first vehicle 102 to share data based on the first vehicle 102 navigating in the environment 100 over a threshold time. In other words, the second vehicle computing device can determine a trajectory that causes the second vehicle 108 to navigate within the threshold distance of the first vehicle 102 to enable sending of the communication 106. Additionally, or alternatively, the first vehicle computing device can output a trajectory for the first vehicle 102 to traverse at a slower velocity, etc. based on the first drive time being over the threshold time. For example, the first vehicle 102 can be controlled in the environment 100 based on the first drive time to reduce a potential error caused by the length of the first drive time, and the trajectory can ensure that the first vehicle 102 continues to operate safely in the environment until a communication is received from another vehicle in a fleet of vehicles.

The first vehicle 102 and the second vehicle 108 can exchange the communication 106 in a variety of ways. For example, the second vehicle 108 can initiate sharing attribute data, location data, or the like based on map data received from a third vehicle that detected the first vehicle 102. In some examples, the communication 106 can be initiated by a remote computing device (e.g., the remote computing device(s) 436, a remote sensor in the environment, or the like without requiring the first vehicle 102 and/or the second vehicle 108 to detect the other vehicle based on sensor data. In various examples, the communication 106 can be caused by a vehicle, remote computing device, and/or remote sensor initiating a communication to a respective vehicle.

In various examples, a vehicle computing device associated with the first vehicle 102 may be configured to detect one or more objects such as object 122 (e.g., via a perception component). In some examples, the vehicle computing device may detect the objects, based on sensor data received from one or more sensors (e.g., a lidar sensor, a radar sensor, a camera, etc.). In some examples, the sensors may include sensors mounted on the first vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning system (GPS) sensors, and the like.

In some examples, the sensors may include one or more remote sensors, such as, for example sensors mounted on another autonomous vehicle, and/or sensors mounted in the environment 100. In various examples, the first vehicle 102 may be configured to transmit and/or receive data from other autonomous vehicles (e.g., one or more autonomous vehicles in a fleet) and/or the sensors. The data may include sensor data, such as data regarding the objects detected in the environment 100. In some examples, the sensors may be mounted in the environment 100 to provide additional visibility in an area of reduced visibility.

In various examples, the vehicle computing device can receive the sensor data and can semantically classify the detected objects (e.g., determine an object type), such as, for example, whether the object is a vehicle such as the object 122, a pedestrian, a building, a truck, a motorcycle, a moped, or the like. The objects may include static objects (e.g., buildings, bridges, signs, etc.) and dynamic objects such as other vehicles, pedestrians, bicyclists, or the like. In some examples, a classification may include another vehicle (e.g., a car, a pick-up truck, a semi-trailer truck, a tractor, a bus, a train, etc.), a pedestrian, a child, a bicyclist, a skateboarder, an equestrian, an animal, or the like. In various examples, the classification of the object may be used by a model to determine object characteristics (e.g., maximum speed, acceleration, maneuverability, etc.). In this way, potential actions by an object may be considered based on characteristics of the object (e.g., how the object may potentially move in the environment).

Though some example input data is described above, the localization component 104 can, in various examples, receive the input data 110 comprising one or more of: sensor data, map data, log data (including historical performance associated with various bias values at one or more times), vehicle state data, object state data, classification data, prediction data, planner data (e.g., predicted trajectories, planned trajectories, etc.), and/or environmental data, to name a few. The localization component 104 can process the input data 110 to determine output data 112. The input data 110 may represent, for example, a vehicle state (position, velocity, acceleration, trajectory, etc.), an object state (position, velocity, acceleration, trajectory, etc.), and/or environmental features based on the map data and/or safety thresholds (e.g., a safety range) for a speed, an acceleration action, a steering action, and/or a braking action. By way of example and not limitation, vehicle state data associated with a vehicle can comprise one or more of: position data, orientation data, heading data, velocity data, speed data, acceleration data, yaw rate data, or turning rate data. In some examples, the input data 110 may indicate (or be used to determine) presence of a region such as a construction zone, a school zone, a crosswalk, a highway, or other region in the environment 100.

In various examples, the output data 112 can represent data for updating a parameter of a sensor, a model, component, etc. For example, the localization component 104 can determine a degradation score, alignment score, or the like for a sensor based on determining a difference between the first localization information in the second localization information. The localization component 104 can, for instance, determine a difference between a first predicted position of the second vehicle 108 by the first vehicle computing device and a second predicted position of the second vehicle 108 by the second vehicle computing device. In examples when the difference meets or exceeds a difference threshold, the localization component 104 can determine output data representing a misalignment between the respective data and request that the sensor of the first vehicle 102 and/or the second vehicle 108 be updated to improve accuracy of future predicted positions (e.g., the sensor associated with the lower drive time and/or more accurate confidence score).

In some examples, the localization component 104 can represent one or more models configured to process the input data 110 to determine location data for the first vehicle 102 that is usable to determine one or more trajectories. For instance, the localization component 104 can determine the output data 112 representing a position, orientation, a pose, etc. with consideration to data received from another vehicle in a fleet of vehicles usable for determining a vehicle trajectory and/or an object trajectory. The planning component 114 can, for example, determine a trajectory for the first vehicle 102 based on object information such as a number of objects, type of object(s), etc. in the environment 100, vehicle information such as a position, velocity, yaw, etc. of the first vehicle 102, environmental data such as weather, ambient light, time of day, time of year, etc., map data such as static features, traffic rules, costs, and so on. Some example costs include: a follow cost, a lane change cost, a blinker cost, a progress cost, a safety cost, an obstacle cost, an interaction cost, an active object cost (e.g., a cost for the object to avoid the first vehicle 102), an inactive object cost, a pedestrian cost, previous vehicle state cost, sensor error cost (e.g., error in pose and/or localization), an animal cost, a bicyclist cost, a light indicator cost (e.g., a taillight or other light of the vehicle or another object), a road network cost, a model cost, and the like.

In some examples, the first vehicle computing device can control operation of the first vehicle 102 based on the output data 112 while in other examples, the localization component 104 can send the output data 112 to another component or model of the first vehicle computing device (e.g., the planning component 114), or a remote computing device, to train model(s) to improve predictions. In various examples, the output data 112 can be used in a decision tree to determine an action for the vehicle (e.g., the trajectory 116 can represent a node of the decision tree). In some examples, the planning component 114 can represent the planning component 426 of FIG. 4.

In some examples, the planning component 114 can determine one or more object trajectories based at least in part on the output data 112 (e.g., the determined trajectory). FIG. 1 depicts the object 122 comprising the trajectory 120, though other numbers of objects and/or object trajectories may be determined in other examples. In various examples, the planning component 114 can determine the trajectory 116 based at least in part the trajectory 118 and/or the trajectory 120.

Figure 2A:
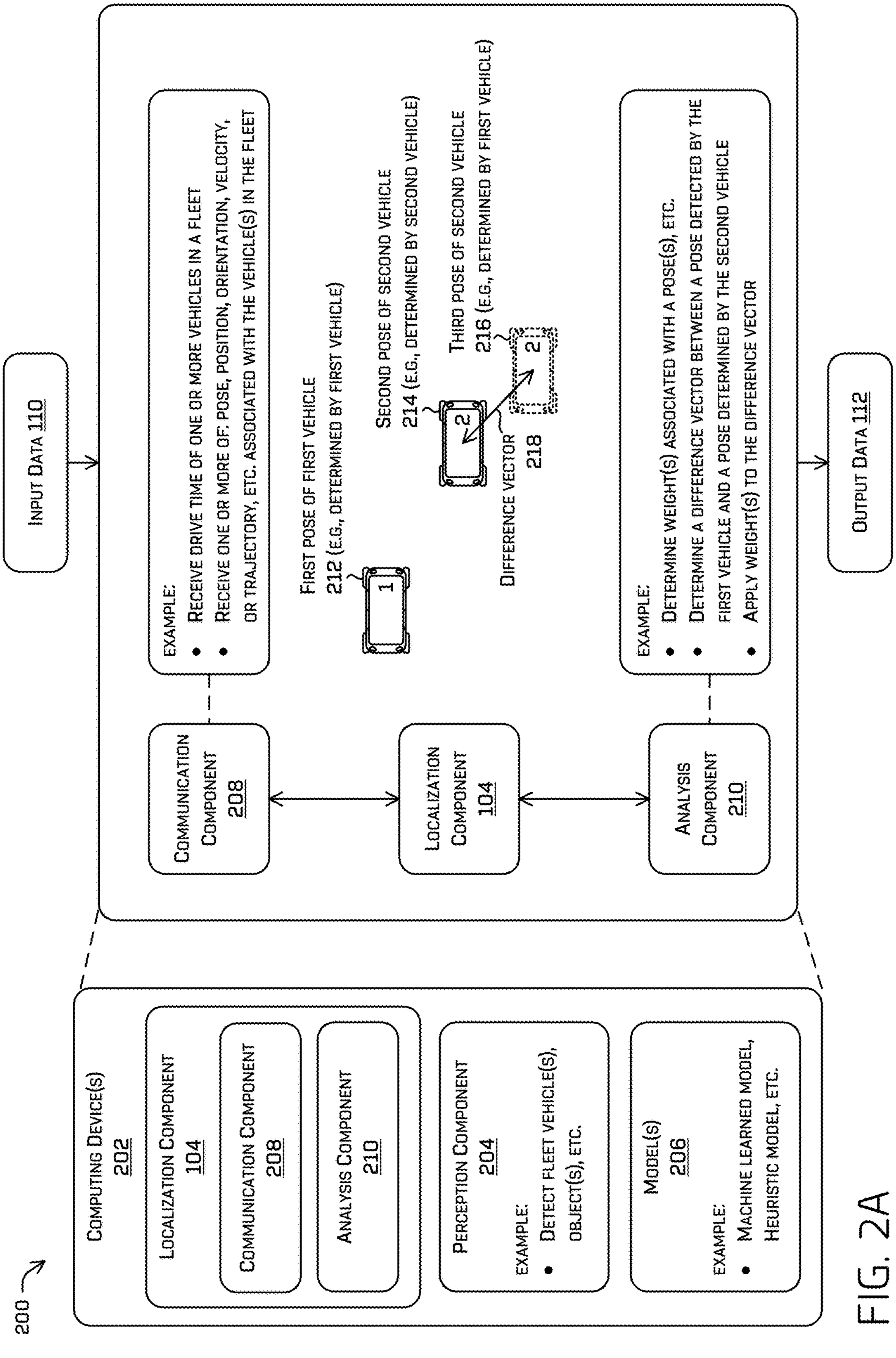
FIG. 2A illustrates an example block diagram of an example computer architecture for implementing techniques to predict vehicle information, as described herein.

FIG. 2A illustrates an example block diagram of an example computer architecture 200 for implementing techniques to predict vehicle information, as described herein. The example computer architecture 200 includes one or more computing devices 202 (also referred to as "the computing device 202") comprising the localization component 104 in FIG. 1. As illustrated, the computing device 202 further comprises a perception component 204 and one or more models 206. The localization component 104 is shown comprising a communication component 208 and an analysis component 210. In some examples, the computing device 202 can represent a vehicle computing device (e.g., vehicle computing device 404) and/or a remote computing device (e.g., computing device(s) 436).

In various examples, the computing device 202 can receive the input data 110 and generate the output data 112 (e.g., a position or a pose, etc.). In some examples, the input data 110 can include a first pose of the first vehicle 212 (e.g., a pose of the first vehicle 102 determined by the first vehicle), a second pose of a second vehicle 214 (e.g., a pose of the second vehicle 108 determined by the second vehicle), and a third pose of the second vehicle 216 (e.g., a pose of the second vehicle 108 determined by the first vehicle). The input data 110 can also include attribute data (e.g., drive time data, a confidence score for a sensor or a prediction (e.g., location, pose, etc.)) associated with one or more vehicles in a fleet of vehicles. As shown in FIG. 2A, the first pose is associated with "1" to indicate the first vehicle and the second pose and the third pose are associated with "2" to indicate the second vehicle. In some examples, the computing device 202 can output a modified pose representing a modification to the first pose of the first vehicle 212 based on processing the input data 110.

The perception component 204 represents functionality to perceive an environment of the first vehicle 102 and may include performing object detection, segmentation, and/or classification. The perception component 204 can represent or otherwise include the functionality of the perception component 422 of FIG. 4. In various examples, the perception component 204 can detect another vehicle in the fleet of vehicles, a static object, a dynamic object, or other features of an environment.

The model(s) 206 may be representative of machine learned models, statistical models, heuristic models, or a combination thereof. The model(s) 206 may refer to a statistical model that is representative of logic and/or mathematical functions that generate approximations which are usable to make predictions. While shown separately in FIG. 2A, functionality associated with the localization component 104, the planning component 114, the perception component 204, the model(s) 206, the communication component 208, the analysis component 210, or other components of the computing device 202 may be incorporated into a single model or component. At least one of the model(s) 206 can, for example, output the first pose, the second pose, or the third pose for use as the input data 110.

The communication component 208 represents functionality to transmit (e.g., send or receive) a message with another vehicle of the fleet of vehicles. The communication component 208 can represent or otherwise include the functionality of the communication connection(s) 410 of FIG. 4. In various examples, the communication component 208 can receive a communication (e.g., the communication 106) from another vehicle in the fleet of vehicles. For example, the communication component 208 can receive one or more of: attribute data (e.g., drive time data, confidence data, etc.), a pose, a position, an orientation, a velocity, a trajectory, state data, map data, etc. from one or more vehicles in the fleet of vehicles. In some examples, the fleet of vehicles can include an autonomous vehicle navigating in an environment with another autonomous vehicle having a longer relative drive time than the drive time of the autonomous vehicle. In some examples, a first vehicle may have a shorter drive time and a lower confidence score for a determined location due to where the first vehicle navigated in the environment (e.g., through a tunnel that affects a location determination, a bumpy road that affects a suspension sensor, etc.). The communication component 208 can receive a message(s) from any number of vehicles and send the data included in the message(s) to the localization component 104. Additionally, or alternatively, the message(s) can be received regardless of line of sight between the vehicles such as from another vehicle in an occluded region (e.g., a region in which it may be difficult to determine presence of a static obstacle, a dynamic object, another vehicle in the fleet, etc.). For example, another vehicle in a fleet of vehicles can transmit a message to and/or from the occluded region.

In various examples, the computing device 202 can implement the analysis component 210 to analyze the input data 110. For example, the analysis component 210 can determine a difference between the second pose of the second vehicle 214 and the third pose of the second vehicle 216, and modify the first pose of the first vehicle 212 based on the difference. In various examples, the analysis component 210 can compare the second pose to the third pose to identify a difference vector 218 between a position and/or orientation associated with the second pose and another position and/or another orientation associated with the third pose. Though the difference vector 218 is shown in FIG. 2A between a center of the respective representations of the second vehicle, the difference vector 218 can be between any portion of the second pose and a corresponding position of the third pose (e.g., a closest edge of the second vehicle in the second pose to a corresponding edge of the second vehicle in the third pose). Further, the difference vector 218 may represent a difference in a distance between respective positions of two poses. In other examples, the difference vector 218 can represent a difference between two velocity measurements (e.g., one by the second vehicle and another by the first vehicle), two trajectory measurements, and so on.

The analysis component 210 can, in some examples, determine a weight for each pose, position, velocity, trajectory, etc. analyzed by the analysis component. For instance, a first weight can be determined for the second pose of the second vehicle 214 and a second weight can be determined for the third pose of the second vehicle 216. The first weight and the second weight can be based on the respective attributes such as drive times for the vehicle that determined the respective pose. In the present example, a lower weight can be assigned to the third pose determined by the first vehicle and a higher weight can be assigned to the second pose determined by the second vehicle given that the second vehicle had a relatively higher confidence score for an attribute or a lower drive time than the first vehicle. In this way, relatively higher scored attributes such as lower drive times can be associated with relatively higher weights.

The analysis component 210 can apply the weights to the difference vector 218 and/or to the first pose of the first vehicle 212 to output a modified pose of the first vehicle. For example, the first weight for the second pose of the second vehicle 214 can be 0.25 and the second weight for the third pose of the second vehicle 216 can be 0.75 based on the drive time of the first vehicle being 8 hours and the drive time of the second vehicle being 2 hours. The weighted difference vector can be used to adjust a value(s) of the first pose to compensate for the additional drive time of the first vehicle relative to the second vehicle. The analysis component 210 can output the adjusted first pose as the output data 112.

Data output by the computing device(s) 202 can be used in a variety of ways. For example, the output data 112 indicating a current pose of the first vehicle can be used to perform a simulation, control a vehicle in the environment at a future time, and/or validate or test vehicle performance, just to name a few. In some examples, the output data 112 may be transmitted to a vehicle computing device (or component thereof such as the perception component 204 or the planning component 114) for further processing. The output data 112 may also or instead be used to perform a simulation (e.g., by a simulation component) between the first vehicle 102 and one or more objects in the environment 100. Additionally, or alternatively, the output data 112 can be used to validate and/or test performance of the first vehicle 102 such as to test a vehicle controller and/or to validate a determination or prediction from a planning component, a prediction component, and the like.

In some examples, the computing device(s) 202 can transmit at least a portion of the output data 112 to a computing device or component configured to control an autonomous vehicle. For example, location data determined by the localization component 104 can be transmitted to a planning component of a vehicle computing device that is configured to determine planning data (e.g., another vehicle trajectory, an object trajectory, an output by a decision tree, etc.) and/or to a vehicle safety system.

In some examples, the output data 112 can be used to validate or test performance of a vehicle. For example, a safety system, such as a collision avoidance system, can receive the location data for processing. Additionally or alternatively, performance of a vehicle controller configured to control some aspect of the vehicle (e.g., a braking system, an acceleration system, and the like) can be validated by enabling the vehicle controller to receive the output data 112 as input.

In various examples, the planned trajectory associated with the output data 112 can be configured for use in a decision tree to control the first vehicle 102. For instance, one or more poses can be associated with a respective reference action, or node of the decision tree.

In various examples, the perception component 204 and/or the analysis component 210 can represent, or otherwise be associated with, a machine learned model. For example, the analysis component 210 can include a machine learned model to determine difference vectors from a third vehicle in the fleet, a fourth vehicle in the fleet, and so on.

Figure 2B:
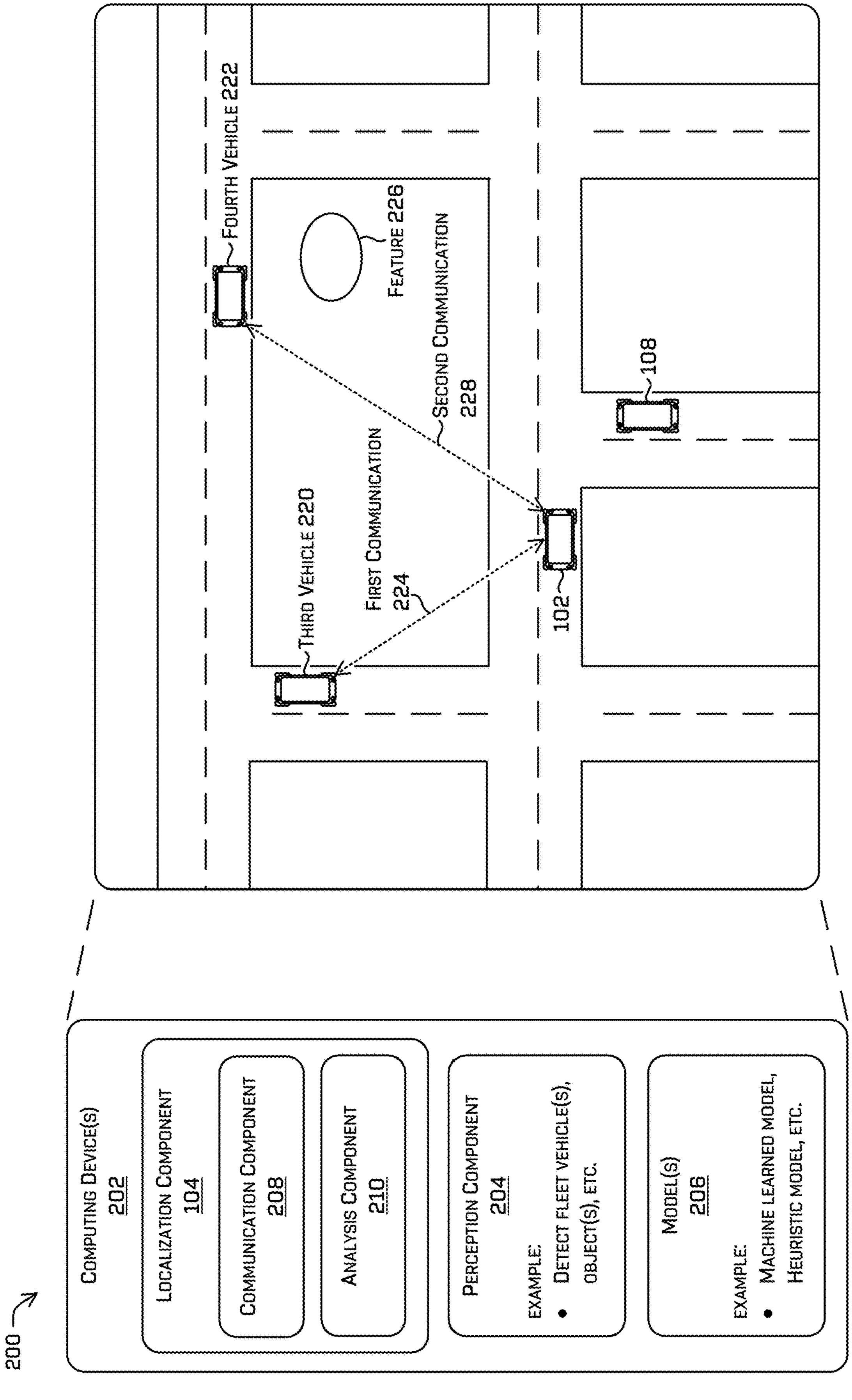
FIG. 2B illustrates an example block diagram of the example computer architecture for implementing additional techniques to predict vehicle information, as described herein.

FIG. 2B illustrates an example block diagram of the example computer architecture 200 for implementing additional techniques to predict vehicle information, as described herein. For example, the computing device(s) 202 can be coupled to or otherwise associated with the first vehicle 102 which is navigating in an environment that includes the second vehicle 108, a third vehicle 220, and a fourth vehicle 222 that are in a same fleet of vehicles (e.g., a fleet of autonomous vehicles). However, in other examples, the computing device(s) 202 can be coupled to a robotic device different from the first vehicle 102 (e.g., another vehicle, another vehicle type, a non-vehicle such as a robotic device operating in another real-world environment such as a warehouse, etc.).

In various examples, the first vehicle 102 can receive a first communication 224 from the third vehicle 220 that comprises one or more attributes, map data, sensor data (or determinations therefrom), etc. associated with the third vehicle 220. For example, the third vehicle 220 can transmit attribute data indicating a drive time, a position, a pose, a confidence score in a determination by a vehicle computing device associated with the third vehicle 220, or the like.

The first vehicle 102 can also or instead receive a second communication 228 from a fourth vehicle 222. For example, the fourth vehicle 222 may be in a dense urban environment that causes it to be obscured from the first vehicle 102 (e.g., in an occluded region relative to the first vehicle 102). As shown in FIG. 2B, the fourth vehicle 222 may be proximate a feature 226 in the environment such as a landmark, a building, or other feature that is usable by the fourth vehicle 222 to calibrate, modify, or update a determination such as a prediction based on sensor data from a sensor of the fourth vehicle 222. For example, the feature 226 can include a known location that can be used by the fourth vehicle 222 to update a parameter or setting or a sensor thereby improving a location determination by the fourth vehicle 222. In some examples, the fourth vehicle 222 can send the second communication 228 to the first vehicle 102 indicating a location of the feature 226, a location of the fourth vehicle 222 based on the feature 226, or the like. For example, the fourth vehicle can adjust its current location based on the feature 226 and send the adjusted location to the first vehicle 102 as the second communication 228 for processing by the localization component 104 of the first vehicle 102. In various examples, the second communication 228 (or other communication) need not include a drive time, though it may be included, at least because the drive time of the fourth vehicle 222 (and optionally degradation of determinations based on the drive time) may be moot based on the fourth vehicle 222 utilizing the feature 226 to correct a deviation (e.g., an error, drift, alteration, or the like) in a sensor over time that may have been caused by the drive time of the fourth vehicle 222.

In some examples, the vehicle 102 can exchange the communication 106 associated with the second vehicle 108, the first communication 224 associated with the third vehicle 220, and/or the second communication 228 associated with the fourth vehicle 222. The first vehicle 102, the second vehicle 108, the third vehicle 220, and the fourth vehicle 222 can be associated with different respective trajectories to navigate in the environment. For example, each of the first vehicle 102, the second vehicle 108, the third vehicle 220, and the fourth vehicle 222 can be associated with a different route, mission, destination, drive time, etc. By way of example and not limitation, the fourth vehicle 222 may navigate to a first destination or otherwise be associated with a mission having a first length of time, and the third vehicle 220 can navigate to a second destination or otherwise be associated with a different mission having a second length of time different from the first length of time. The third vehicle 220 can be associated with a shorter mission relative to the fourth vehicle 222 but incur an error, a deviation, a drift, or variance in a sensor or determination therefrom (e.g., caused by a driving condition in the environment). In examples, the fourth vehicle 222 can determine its location based at least in part on driving proximate the feature 226 thereby improving a confidence score in its determined location relative to a previous location determination. In this way, the fourth vehicle 222 can "re-localize" itself based on its distance from the feature 226 (e.g., a landmark having a known location based on map data).

In some examples, the analysis component 210 can determine a score for information, a determination(s), and/or a prediction(s) associated with a vehicle. For example, the analysis component 210 can determine a first score for the first vehicle 102 and a second score for the third vehicle 220 (and so on for any number of vehicles), and use the score to weigh the information, the determination(s), and/or the prediction(s) associated with the respective vehicle. For example, the first score and the second score can be used to determine a difference vector (e.g., which data to rely on) when the localization component 104 generates the output data 112.

Figure 3:
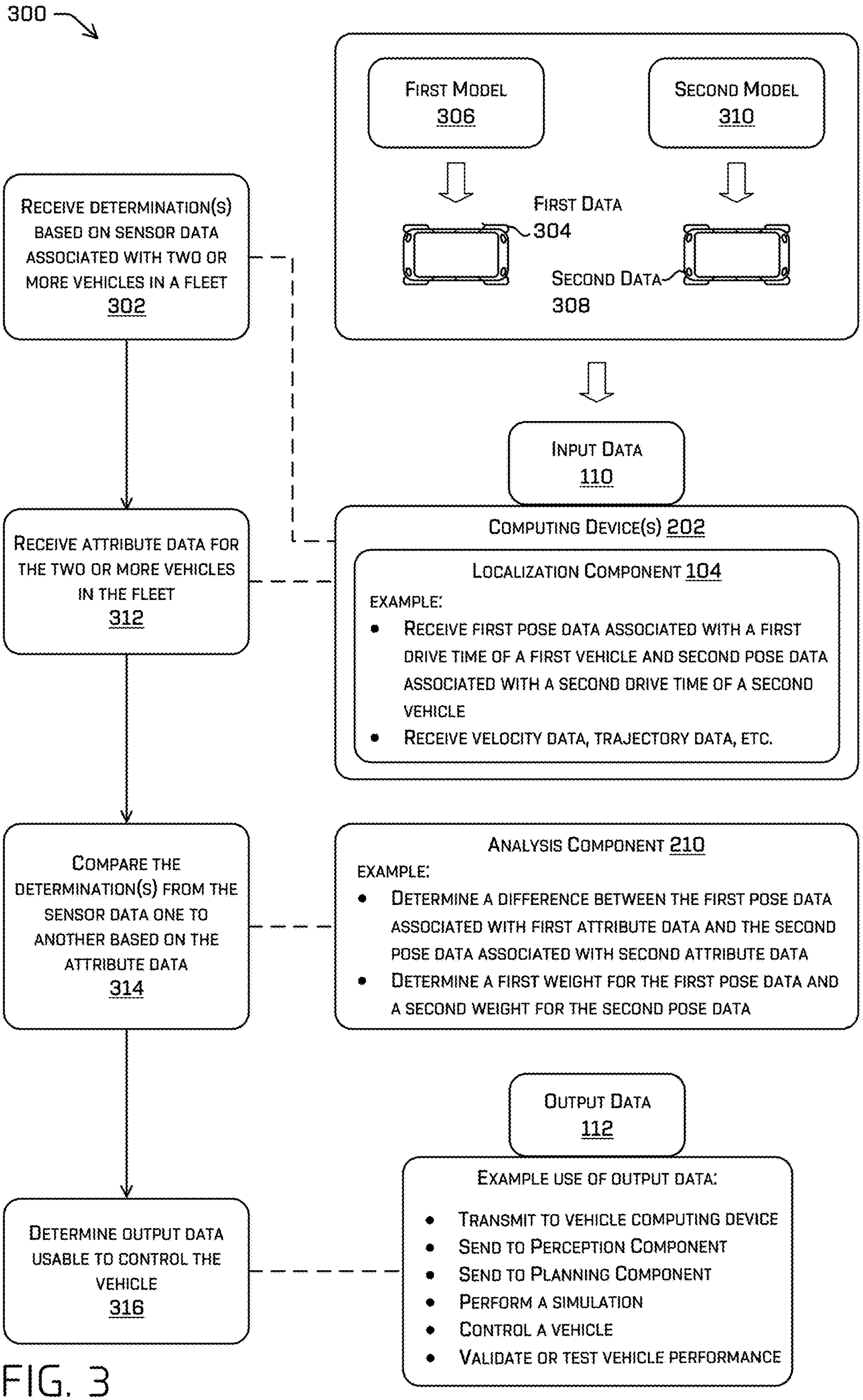
FIG. 3 is a pictorial flow diagram of an example process for implementing techniques to determine a pose to control a vehicle.

FIG. 3 is a pictorial flow diagram of an example process 300 for implementing techniques to determine a pose to control a vehicle. For example, the first vehicle 102 can implement a model (e.g., the localization component 104) and/or a perception component (the perception component 204) to predict location data for the first vehicle 102 based on a communication 106 from another vehicle in a same fleet as the first vehicle 102. The example process 300 may be implemented by a computing device such as the computing device(s) 202 of FIG. 2A, the vehicle computing device(s) 404 of FIG. 4, and/or the computing device(s) 436 of FIG. 4.

An operation 302 can include receiving determinations based on sensor data associated with two or more vehicles in a fleet. For example, the computing device 202 can receive first data 304 from a first model 306 and second data 308 from a second model 310. The first model 306 can be associated with a first vehicle (e.g., the first vehicle 102) and the second model 310 can be associated with a second vehicle (e.g., the second vehicle 108). However, in other examples, the first model 306 and the second model 310 can be associated with a same vehicle and include different drive times (e.g., be deployed by the vehicle at different times, configured at different times, calibrated at different times, etc.). In some examples, the computing device 202 can receive the first data 304 and the second data 308 as at least some of the input data 110. For example, the first data 304 can represent first location data (e.g., a position, a pose, etc.), first state data, or other data determined by the first vehicle and the second data 308 can represent second location data, second state data, or other data determined by the second vehicle.

In some examples, the first data 304 can include first pose data representing a first pose of the first vehicle and a second pose of the second vehicle. The first vehicle can determine the first data 304 based on the first model 306 processing sensor data associated with one or more sensors associated with the first vehicle. The second data 308 can include second pose data representing third pose of the second vehicle based on the second model 310 processing sensor data associated with one or more sensors of the second vehicle. The first model 306 can represent, for example, the perception component 204, the planning component 114, to name a few. In some examples, the second data 308 can be received as a message (e.g., the communication 106) from the second vehicle. The message may be transmitted by the second vehicle based on another message sent from the first vehicle (e.g., using the communication component 208) requesting information about the second vehicle. In various examples, the first model 306 and the second model 310 can transmit respective data to the localization component 104 for processing.

An operation 312 can include receiving attribute data (e.g., drive time data) from two or more vehicles in the fleet. For instance, the localization component 104 can receive a first drive time, first confidence score, first map data, etc. associated with the first vehicle and a second drive time, a second confidence score, second map data, etc. associated with the second vehicle. In examples that include drive time data, each respective drive time can include an amount of time that a respective vehicle has navigated in the environment (e.g., traversed to a destination, time from a vehicle computing device has been initiated, etc.). In one example, the localization component 104 can receive the first pose data, the second pose data, the first drive time of the first vehicle, and the second drive time of the second vehicle. In some examples, the localization component 104 can also or instead receive velocity data, trajectory data, or other state data associated with a respective vehicle.

An operation 314 can include comparing the determinations from the sensor data one to another based on the attribute data. The localization component 104 can, for example, compare, as a first comparison, the second pose of the second vehicle and the third pose of the second vehicle and, as a second comparison, the first attribute data (e.g., the first drive time) and the second attribute data (e.g., the second drive time). In various examples, the localization component 104 can determine a difference between at least some of the first pose data associated with the first drive time and at least some of the second pose data associated with the second drive time. Comparing the determinations may also or instead include the localization component 104 determining a first weight for the first data 304 (e.g., the second pose) and a second weight for the second data 308 (e.g., a the third pose).

An operation 316 can include determining output data usable to control the vehicle. For example, the computing device 202 can generate the output data 112 including a current pose of the first vehicle based on the first comparison between the second and third poses of the second vehicle and the second comparison between the first attribute data and the second attribute data. The localization component 104 can apply the first weight and the second weight to the first pose of the first vehicle to determine the current pose representing a modification of the first pose. In some examples, the output data 112 can be transmitted to a vehicle computing device (associated with the first vehicle 102 or another vehicle in a fleet of vehicles), a vehicle safety system, or sent to a simulation component to initiate a simulation between the first vehicle 102, the second vehicle 108, and one or more objects. The output data 112 can also or instead be used to test or validate performance of a vehicle controller, model, or component.

By implementing the techniques described herein, safety of the autonomous vehicle can be improved by determining location data for use in controlling the autonomous vehicle in a real-world environment. In some examples, the techniques enable vehicle performance determinations such as how a vehicle responds to an object(s) in a simulated scenario and/or in the real-world environment.

While described as a separate system, in some examples, techniques to determine location data described herein in relation to FIGS. 1-3 may be implemented by other vehicle systems, components, and/or computing devices. For example, and as will be described in further detail with regard to FIG. 4, the prediction techniques described herein in relation to FIGS. 1-3 may be implemented at least partially by or in association with a perception component, a planning component, and/or a model component of FIG. 4.

Figure 4:
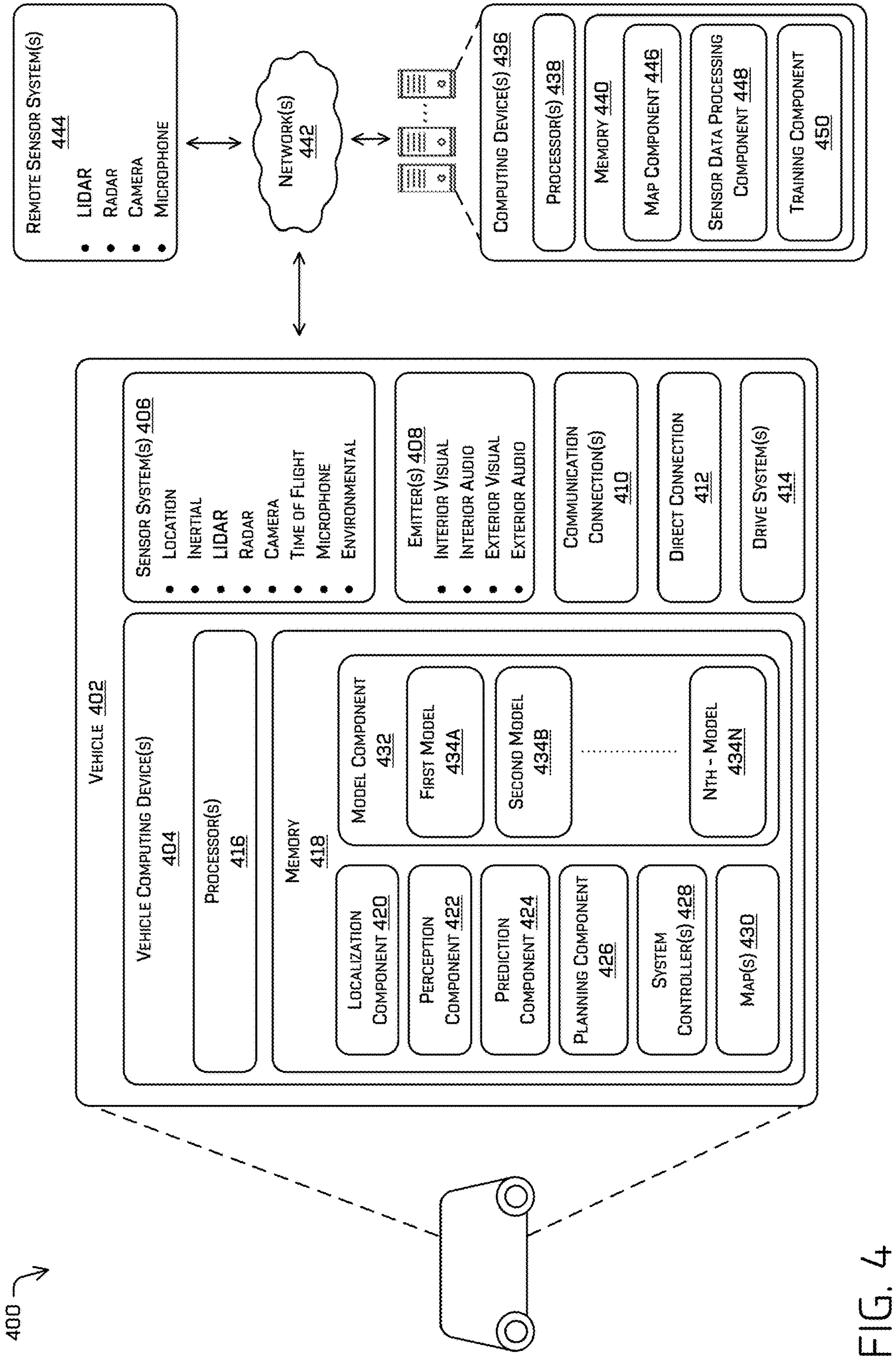
FIG. 4 is a block diagram of an example system for implementing the techniques described herein.

FIG. 4 is a block diagram of an example system 400 for implementing the techniques described herein. In at least one example, the system 400 may include a vehicle, such as vehicle 402.

The vehicle 402 may include one or more vehicle computing device(s) 404, one or more sensor systems 406, one or more emitters 408, one or more communication connections 410, at least one direct connection 412, and one or more drive system(s) 414.

The vehicle computing device(s) 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In some instances, the autonomous vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 402 may be a fully or partially autonomous vehicle having any other level or classification.

In various examples, the vehicle computing device(s) 404 may store sensor data associated with actual location of an object at the end of the set of estimated states (e.g., end of the period of time) and may use this data as training data to train one or more models. In some examples, the vehicle computing device(s) 404 may provide the data to a remote computing device (i.e., computing device separate from vehicle computing device such as the computing device(s) 436) for data analysis. In such examples, the remote computing device(s) may analyze the sensor data to determine an actual location, velocity, direction of travel, or the like of the object at the end of the set of estimated states.

In the illustrated example, the memory 418 of the vehicle computing device(s) 404 stores a localization component 420, a perception component 422, a prediction component 424, a planning component 426, one or more system controllers 428, one or more maps 430, and a model component 432 including one or more model(s), such as a first model 434A, a second model 434B, up to an Nth model 434N (collectively "models 434"), where N is an integer. Though depicted in FIG. 4 as residing in the memory 418 for illustrative purposes, it is contemplated that the localization component 420, the perception component 422, the prediction component 424, the planning component 426, one or more system controllers 428, one or more maps 430, and/or the model component 432 including the model(s) 434 may additionally, or alternatively, be accessible to the vehicle 402 (e.g., stored on, or otherwise accessible by, memory remote from the vehicle 402, such as, for example, on memory 440 of a remote computing device 436).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 430 and/or map component 446, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some examples, the localization component 420 may include functionality of the localization component 104.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In some examples, the perception component 422 may include functionality of the localization component 104 and/or the perception component 204.

The prediction component 424 can generate one or more probability maps representing prediction probabilities of possible locations of one or more objects in an environment. For example, the prediction component 424 can generate one or more probability maps for vehicles, pedestrians, animals, and the like within a threshold distance from the vehicle 402. In some instances, the prediction component 424 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 424 may generate predicted trajectories of objects (e.g., objects) in an environment and/or to generate predicted candidate trajectories for the vehicle 402. For example, the prediction component 424 may generate one or more predicted trajectories for objects within a threshold distance from the vehicle 402. In some examples, the prediction component 424 may measure a trace of an object and generate a trajectory for the object based on observed and predicted behavior.

In some examples, the prediction component 424 may include functionality of the localization component 104.

In general, the planning component 426 may determine a path for the vehicle 402 to follow to traverse through an environment. For example, the planning component 426 may determine various routes and trajectories and various levels of detail. For example, the planning component 426 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 426 may generate an instruction for guiding the autonomous vehicle along at least a portion of the route from the first location to the second location. In at least one example, the planning component 426 may determine how to guide the autonomous vehicle from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 426 can select a trajectory for the vehicle 402 based at least in part on receiving data representing an output of the model component 432.

In other examples, the planning component 426 can alternatively, or additionally, use data from the localization component 420, the perception component 422, and/or the prediction component 424 to determine a path for the vehicle 402 to follow to traverse through an environment. For example, the planning component 426 can receive data from the localization component 420, the perception component 422, and/or the prediction component 424 regarding objects associated with an environment. Using this data, the planning component 426 can determine a route to travel from a first location (e.g., a current location) to a second location (e.g., a target location) to avoid objects in an environment. In at least some examples, such a planning component 426 may determine there is no such collision free path and, in turn, provide a path which brings vehicle 402 to a safe stop avoiding all collisions and/or otherwise mitigating damage. Additionally or alternatively, the planning component 426 can determine the path for the vehicle 402 to follow based at least in part on data received from a simulation component and/or the localization component 104 as described in FIGS. 1-3 and elsewhere.

In some examples, the planning component 426 may include functionality of the localization component 104 and/or the planning component 114.

In at least one example, the vehicle computing device(s) 404 may include one or more system controllers 428, which may be configured to control steering, propulsion, braking, safety, emitters, communication, and other systems of the vehicle 402. The system controller(s) 428 may communicate with and/or control corresponding systems of the drive system(s) 414 and/or other components of the vehicle 402.

The memory 418 may further include one or more maps 430 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In examples, a map may include a three-dimensional mesh of the environment. In some examples, the vehicle 402 may be controlled based at least in part on the map(s) 430. That is, the map(s) 430 may be used in connection with the localization component 420, the perception component 422, the prediction component 424, and/or the planning component 426 to determine a location of the vehicle 402, detect objects in an environment, generate routes, determine actions and/or trajectories to navigate within an environment.

In some examples, the one or more maps 430 may be stored on a remote computing device(s) (such as the computing device(s) 436) accessible via network(s) 442. In some examples, multiple maps 430 may be stored based on, for example, a characteristic (e.g., type of entity, time of day, day of week, season of the year, etc.). Storing multiple maps 430 may have similar memory requirements, but increase the speed at which data in a map may be accessed.

As illustrated in FIG. 4, the vehicle computing device(s) 404 may include a model component 432. The model component 432 may be configured to perform the functionality of the localization component 104, including predicting a pose, position, or other data based on an inter-vehicle communication. In various examples, the model component 432 may receive one or more features associated with the detected object(s) from the perception component 422 and/or from the sensor system(s) 406. In some examples, the model component 432 may receive environment characteristics (e.g., environmental factors, etc.) and/or weather characteristics (e.g., weather factors such as snow, rain, ice, etc.) from the perception component 422 and/or the sensor system(s) 406. While shown separately in FIG. 4, the model component 432 could be part of the prediction component 424, the planning component 426, or other component(s) of the vehicle 402.

In various examples, the model component 432 may send predictions from the one or more models 434 that may be used by the prediction component 424 and/or the planning component 426 to generate one or more predicted trajectories of the object (e.g., direction of travel, speed, etc.) and/or one or more predicted trajectories of the object (e.g., direction of travel, speed, etc.), such as from the prediction component thereof. In some examples, the planning component 426 may determine one or more actions (e.g., reference actions and/or sub-actions) for the vehicle 402, such as vehicle candidate trajectories. In some examples, the model component 432 may be configured to determine audio data for emitting into a portion of an environment based at least in part on the one or more actions for the vehicle 402. In some examples, the model component 432 may be configured to determine audio characteristics that are applicable to the environment, such as based on environment characteristics, weather characteristics, or the like.

In various examples, the model component 432 may utilize machine learned techniques to predict audio associated with an object or region. In such examples, the machine learned algorithms may be trained to determine, based on sensor data and/or previous predictions by the model, that an object is likely to behave in a particular way relative to the vehicle 402 at a particular time during a set of estimated states (e.g., time period). In such examples, one or more of the vehicle 402 state (position, velocity, acceleration, trajectory, etc.) and/or the object state, classification, etc. may be input into such a machine learned model and, in turn, a behavior prediction may be output by the model.

In various examples, characteristics associated with each object type may be used by the model component 432 to determine frequency information, sound intensity, and other characteristics for one or more objects. Examples of characteristics of an object type may include, but not be limited to: a maximum longitudinal acceleration, a maximum lateral acceleration, a maximum vertical acceleration, a maximum speed, maximum change in direction for a given speed, and the like.

As can be understood, the components discussed herein (e.g., the localization component 420, the perception component 422, the prediction component 424, the planning component 426, the one or more system controllers 428, the one or more maps 430, the model component 432 including the model(s) 434 are described as divided for illustrative purposes. However, the operations performed by the various components may be combined or performed in any other component.

While examples are given in which the techniques described herein are implemented by a planning component and/or a model component of the vehicle, in some examples, some or all of the techniques described herein could be implemented by another system of the vehicle, such as a secondary safety system. Generally, such an architecture can include a first computing device to control the vehicle 402 and a secondary safety system that operates on the vehicle 402 to validate operation of the primary system and to control the vehicle 402 to avoid collisions.

In some instances, aspects of some or all of the components discussed herein may include any models, techniques, and/or machine learned techniques. For example, in some instances, the components in the memory 418 (and the memory 440, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3(ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional or alternate examples of architectures may include neural networks such as ResNet-50, ResNet-101, VGG, DenseNet, PointNet, Xception, ConvNeXt, and the like; visual transformer(s) (ViT(s)), such as a bidirectional encoder from image transformers (BEiT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, RoBERTa, XLNet, GPT-2, GPT-3, or the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device(s) 404. Additionally, or in the alternative, the sensor system(s) 406 may send sensor data, via the one or more networks 442, to the one or more computing device(s) 436 at a particular frequency, after a lapse of a predetermined period of time, in near real-time, etc.

The vehicle 402 may also include one or more emitters 408 for emitting light and/or sound. The emitter(s) 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., remote computing device 436, other nearby vehicles, etc.) and/or one or more remote sensor system(s) 444 for receiving sensor data. The communications connection(s) 410 also enable the vehicle 402 to communicate with a remote teleoperations computing device or other remote services.

The communications connection(s) 410 may include physical and/or logical interfaces for connecting the vehicle computing device(s) 404 to another computing device or a network, such as network(s) 442. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In some examples, the communications connection(s) 410 may represent or include the functionality associated with the communication component 208.

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive system controller which may receive and preprocess data from the sensor system(s) and to control operation of the various vehicle systems. In some examples, the drive system controller may include one or more processors and memory communicatively coupled with the one or more processors. The memory may store one or more components to perform various functionalities of the drive system(s) 414. Furthermore, the drive system(s) 414 may also include one or more communication connection(s) that enable communication by the respective drive system with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the prediction component 424, the planning component 426, the one or more system controllers 428, the one or more maps 430, and the model component 432, may process sensor data, as described above, and may send their respective outputs, over the one or more network(s) 442, to the computing device(s) 436. In at least one example, the localization component 420, the perception component 422, the prediction component 424, the planning component 426, the one or more system controllers 428, the one or more maps 430, and the model component 432 may send their respective outputs to the remote computing device(s) 436 at a particular frequency, after a lapse of a predetermined period of time, in near real-time, etc.

In some examples, the vehicle 402 may send sensor data to the computing device(s) 436 via the network(s) 442. In some examples, the vehicle 402 may receive sensor data from the computing device(s) 436 and/or remote sensor system(s) 444 via the network(s) 442. The sensor data may include raw sensor data and/or processed sensor data and/or representations of sensor data. In some examples, the sensor data (raw or processed) may be sent and/or received as one or more log files.

The computing device(s) 436 may include processor(s) 438 and a memory 440 storing the map component 446, a sensor data processing component 448, and a training component 450. In some examples, the map component 446 may include functionality to generate maps of various resolutions. In such examples, the map component 446 may send one or more maps to the vehicle computing device(s) 404 for navigational purposes. In various examples, the sensor data processing component 448 may be configured to receive data from one or more remote sensors, such as sensor system(s) 406 and/or remote sensor system(s) 444. In some examples, the sensor data processing component 448 may be configured to process the data and send processed sensor data to the vehicle computing device(s) 404, such as for use by the model component 432 (e.g., the model(s) 434). In some examples, the sensor data processing component 448 may be configured to send raw sensor data to the vehicle computing device(s) 404.

In some instances, the training component 450 can include functionality to train a machine learning model to output evaluate trajectories. For example, the training component 450 can receive sensor data that represents an object traversing through an environment for a period of time, such as 0.1 milliseconds, 1 second, 3, seconds, 5 seconds, 7 seconds, and the like. At least a portion of the sensor data can be used as an input to train the machine learning model.

In some instances, the training component 450 may be executed by the processor(s) 438 to train a machine learning model based on training data. The training data may include a wide variety of data, such as sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining risk associated with evaluated trajectories and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 450 can include functionality to train a machine learning model to output classification values. For example, the training component 450 can receive data that represents labelled collision data (e.g., publicly available data, sensor data, and/or a combination thereof). At least a portion of the data can be used as an input to train the machine learning model. Thus, by providing data where the vehicle traverses an environment, the training component 450 can be trained to output potential intersection(s) associated with objects, as discussed herein.

In some examples, the training component 450 can include training data that has been generated by a simulator. For example, simulated training data can represent examples where a vehicle collides with an object in an environment or nearly collides with an object in an environment, to provide additional training examples.

The processor(s) 416 of the vehicle 402 and the processor(s) 438 of the computing device(s) 436 may be any suitable processor capable of executing instructions to process data and perform operations as described herein. By way of example and not limitation, the processor(s) 416 and 438 may comprise one or more Central Processing Units (CPUs), Graphics Processing Units (GPUs), Tensor Processing Units (TPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and memory 440 are examples of non-transitory computer-readable media. The memory 418 and memory 440 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 4 is illustrated as a distributed system, in alternative examples, components of the vehicle 402 may be associated with the computing device(s) 436 and/or components of the computing device(s) 436 may be associated with the vehicle 402. That is, the vehicle 402 may perform one or more of the functions associated with the computing device(s) 436, and vice versa.

Figure 5:
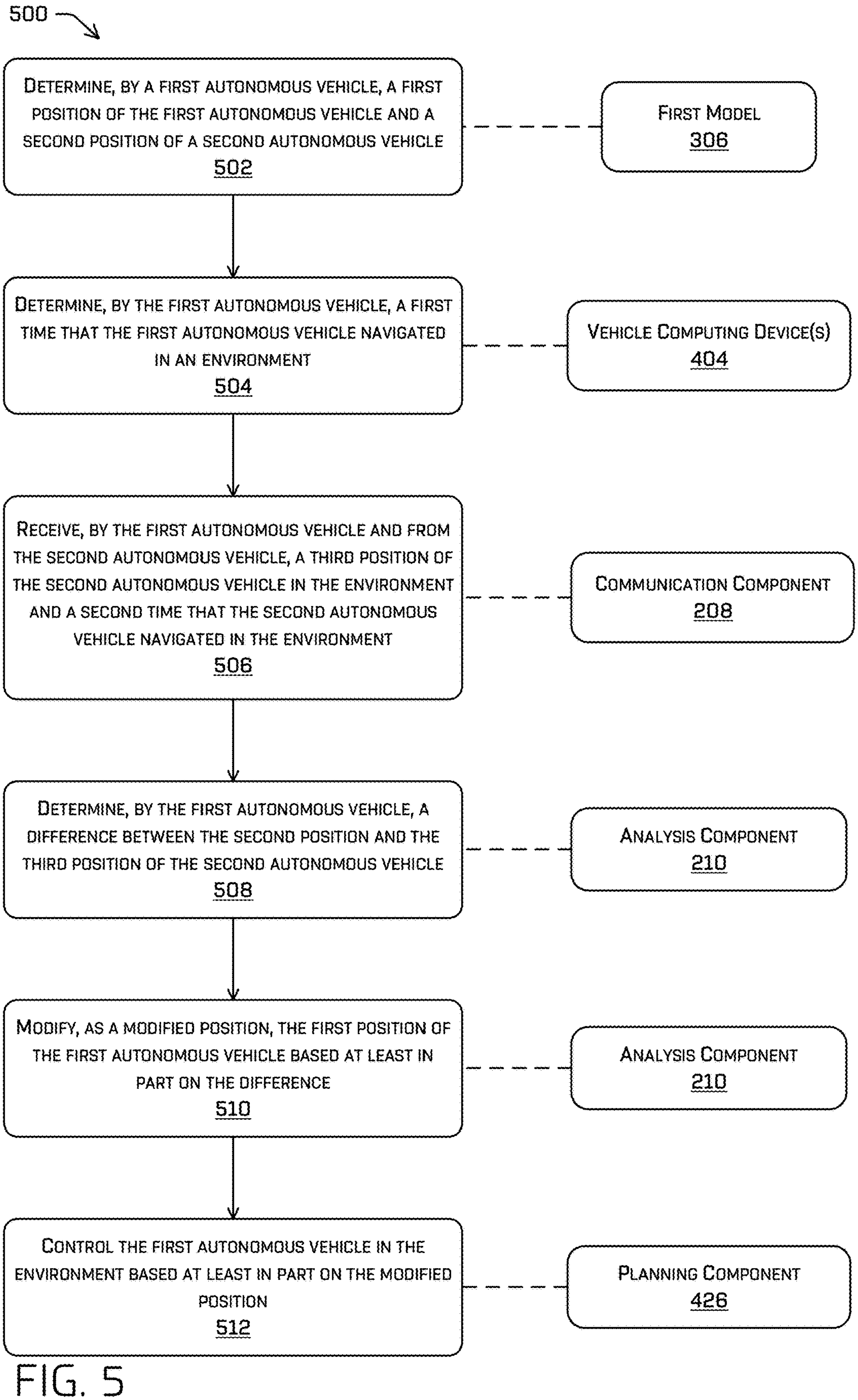
FIG. 5 is a flowchart depicting an example process for determining a vehicle position using one or more example components.

FIG. 5 is a flowchart depicting an example process 500 for determining a vehicle position using one or more example components. For example, some or all of the process 500 can be performed by one or more components in FIGS. 1-4, as described herein. For example, some or all of the process 500 can be performed by the vehicle computing device(s) 404, the computing device(s) 436, or the computing device 202. However, the process 500 is not limited to being performed by these components, and the components are not limited to performing the process 500.

At operation 502, the process 500 can include determining, by a first autonomous vehicle, a first position of the first autonomous vehicle and a second position of a second autonomous vehicle. In some examples, the operation 502 may include the vehicle computing device 404 or the computing device 202 implementing a localization component 104 to receive processed sensor data from a first model 306 associated with the first autonomous vehicle indicating a first predicted position of the first autonomous vehicle and a second predicted position of the second autonomous vehicle. The first autonomous vehicle and the second autonomous vehicle can be associated with a same fleet of autonomous vehicles, and the first autonomous vehicle can receive the second position from the second autonomous vehicle based on the second autonomous vehicle being within a threshold distance of the first autonomous vehicle.

In some examples, the first autonomous vehicle can detect the second autonomous vehicle and request additional position data, or other data, from the second autonomous vehicle.

At operation 504, the process may include determining, by the first autonomous vehicle, a first time that the first autonomous vehicle navigated in an environment. In some examples, the operation 504 may include a first vehicle computing device determining a first drive time for the first autonomous vehicle. For example, the first vehicle computing device can send a length of time that the first autonomous vehicle has navigated in a real-world environment to the localization component 104. The first drive time can include an amount of time since the first vehicle computing device has been calibrated, configured, or otherwise been traversing the environment to a destination. In other examples, the operation 504 can include determining first attribute data (e.g., instead of or in addition to the first time).

At operation 506, the process may include receiving, by the first autonomous vehicle and from the second autonomous vehicle, a third position of the second autonomous vehicle in the environment and a second time that the second autonomous vehicle navigated in the environment. The operation 506 may include, for example, the vehicle computing device 404 implementing a communication component (e.g., the communication component 208 or the communication connection(s) 410) to receive, as a message, a third predicted position of the second autonomous vehicle based on processed sensor data from one or more sensors associated with the second autonomous vehicle. The message can also second drive time information indicating a length of time that the second autonomous vehicle has navigated in the real-world environment. In some examples, the data included in the message can be based on additional processed sensor data from a second model 310 associated with the second autonomous vehicle (e.g., the second vehicle 108). In other examples, the operation 506 can include determining second attribute data (e.g., instead of or in addition to the second time).

At operation 508, the process may include determining, by the first autonomous vehicle, a difference between the second position and the third position of the second autonomous vehicle. In some examples, the operation 508 may include the vehicle computing device 404 implementing the analysis component 210 to determine a difference between the second position of the second autonomous vehicle determined by the first autonomous vehicle and the third position of the second autonomous vehicle determined by the second autonomous vehicle. In various examples, the difference can be based on how the respective sensors of the first and second autonomous vehicles capture information in the environment which can vary according to the first time that the first autonomous vehicle navigated in the environment and the second time that the second autonomous vehicle navigated in the environment.

At operation 510, the process may include modifying, as a modified position, the first position of the first autonomous vehicle based at least in part on the difference. In some examples, the operation 510 may include the analysis component 210 determining a modified position of the first autonomous vehicle that accounts for a variation, or difference, between the second and third positions. For example, the analysis component 210 can adjust the first position of the first autonomous vehicle based on a first weight assigned to the second position and a second weight assigned to the third position. In various examples, the first weight can be lower than the second weight based on the first time being greater than the second time (e.g., the second autonomous vehicle having a lower overall drive time in the environment). In some examples, the first weight can be lower than the second weight based on the first weight associated with the second position having a lower confidence score for a first attribute(s) than a corresponding confidence score for a second attribute(s) associated with the third position.

At operation 512, the process may include controlling the first autonomous vehicle in the environment based at least in part on the modified position. In some examples, the operation 512 may include the controlling the vehicle 402 based on the planned trajectory determined by the localization component 104. In some examples, the operation 512 may include the planning component 426 controlling a braking system, an acceleration system, a steering system, a drive system, etc. of the vehicle 402 (e.g., using a planned trajectory) based on an output from the analysis component 210 (e.g., the modified position of the first autonomous vehicle).

FIGS. 3 and 5 illustrate example processes 300 and 500 in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted and/or combined in any order and/or in parallel to implement the processes.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. By way of example and not limitation, operation 510 may be performed without operation 512. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform operations comprising: detecting, based at least in part on sensor data associated with a sensor of a first autonomous vehicle, a second autonomous vehicle in a vicinity of the first autonomous vehicle; determining, by the first autonomous vehicle and based on the sensor data, a first pose of the first autonomous vehicle and a second pose of the second autonomous vehicle; determining, by the first autonomous vehicle, a first time that the first autonomous vehicle navigated in an environment; determining that the first autonomous vehicle and the second autonomous vehicle are associated with a same fleet of autonomous vehicles; initiating, based at least in part on determining that the first autonomous vehicle and the second autonomous vehicle are associated with the same fleet of autonomous vehicles, a communication between the first autonomous vehicle and the second autonomous vehicle; receiving, by the first autonomous vehicle and as part of the communication, a third pose of the second autonomous vehicle in the environment and a second time that the second autonomous vehicle navigated in the environment; determining a first weight for the second pose of the second autonomous vehicle and a second weight for the third pose of the second autonomous vehicle, the second weight greater than the first weight; modifying, as a modified pose, the first pose of the first autonomous vehicle based at least in part on the first weight and the second weight; and controlling the first autonomous vehicle in the environment based at least in part on the modified pose.

B: The system of paragraph A, the operations further comprising: determining that the second time that the second autonomous vehicle navigated in the environment is less than the first time that the first autonomous vehicle navigated in the environment; determining the first weight for the second pose of the second autonomous vehicle based at least in part on the first time that the first autonomous vehicle navigated in the environment; and determining the second weight for the third pose of the second autonomous vehicle based at least in part on the second time that the second autonomous vehicle navigated in the environment, wherein the second weight is greater than the first weight based at least in part on determining that the second time that the second autonomous vehicle navigated in the environment is less than the first time that the first autonomous vehicle navigated in the environment.

C: The system of paragraph A or B, the operations further comprising: receiving position data relative to a fixed reference system of the first autonomous vehicle, wherein modifying the first pose is further based at least in part on the position data.

D: The system of any of paragraphs A-C, the operations further comprising: determining that the first time of the first autonomous vehicle is above a time threshold; and modifying a trajectory of the second autonomous vehicle to cause the second autonomous vehicle to navigate to within a threshold distance of the first autonomous vehicle, wherein detecting the second autonomous vehicle is based at least in part on modifying the trajectory of the second autonomous vehicle.

E: The system of any of paragraphs A-D, the operations further comprising: determining, based at least in part on the third pose in the communication, a difference between a first determination of the first autonomous vehicle and a second determination associated with the second autonomous vehicle; and determining an alignment score for the sensor based at least in part on the difference.

F: One or more non-transitory computer-readable media storing instructions executable by one or more processors, wherein the instructions, when executed, cause the one or more processors to perform operations comprising: determining, by a first vehicle, a first position of the first vehicle and a second position of a second vehicle, the first vehicle and the second vehicle associated with a same fleet of vehicles; determining, by the first vehicle, a first attribute associated with the first vehicle navigating in an environment; receiving, by the first vehicle and from the second vehicle, a third position of the second vehicle in the environment and a second attribute associated with the second vehicle navigating in the environment; determining, by the first vehicle, a difference between the second position and the third position of the second vehicle; modifying, as a modified position, the first position of the first vehicle based at least in part on the difference; and controlling the first vehicle in the environment based at least in part on the modified position.

G: The one or more non-transitory computer-readable media of paragraph F, the operations further comprising: determining a first weight for the second position of the second vehicle based at least in part on the first attribute; and determining a second weight for the third position of the second vehicle based at least in part on the second attribute, wherein: the second weight greater than the first weight, and modifying the first position of the first vehicle based at least in part on the first weight and the second weight.

H: The one or more non-transitory computer-readable media of paragraph F or G, the operations further comprising: initiating, based at least in part on determining that the first vehicle and the second vehicle are associated with the same fleet of vehicles, a communication between the first vehicle and the second vehicle, wherein receiving the third position of the second vehicle is based at least in part on initiating the communication.

I: The one or more non-transitory computer-readable media of any of paragraphs F-H, the operations further comprising: determining sensor data associated with one or more sensor associated with the first vehicle, wherein: the first position, the second position, and the first attribute are determined based on the sensor data, the third position is determined based on receiving a communication from the second vehicle, and the communication is initiated by one of: the first vehicle or the second vehicle based on a proximity between the first vehicle and the second vehicle being within a threshold distance.

J: The one or more non-transitory computer-readable media of any of paragraphs F-I, the operations further comprising: receiving position data relative to a fixed reference system of the first vehicle, wherein modifying the first position is further based at least in part on the position data.

K: The one or more non-transitory computer-readable media of any of paragraphs F-J, wherein the first attribute is a time period that the first vehicle navigated in the environment, and the operations further comprising: determining that the time period of the first vehicle is above a time threshold; and modifying a trajectory of the second vehicle to cause the second vehicle to navigate to within a threshold distance of the first vehicle, wherein receiving the third position from the second vehicle is based at least in part on modifying the trajectory of the second vehicle.

L: The one or more non-transitory computer-readable media of any of paragraphs F-K, the operations further comprising: determining, based at least in part on the third position, a misalignment score between a first sensor of the first vehicle and a second sensor associated with the second vehicle; and modifying a parameter of the first sensor based at least in part on the misalignment score.

M: The one or more non-transitory computer-readable media of any of paragraphs F-L, wherein: the first attribute is a time that the first vehicle navigated in the environment, and the operations further comprise: determining that the time of the first vehicle is above a time threshold; and modifying a trajectory, a speed, or a location of the first vehicle based at least in part on determining that the time of the first vehicle is above the time threshold.

N: The one or more non-transitory computer-readable media of any of paragraphs F-M, wherein the difference is a first difference, and the operations further comprising: receiving, by the first vehicle, velocity information of the second vehicle; determining a second difference between a predicted velocity and the velocity information; and estimating a degradation of a sensor of the first vehicle based at least in part on the second difference.

O: The one or more non-transitory computer-readable media of any of paragraphs F-N, the operations further comprising: determining a first score associated with the first vehicle based at least in part on the first attribute; and determining a second score associated with the second vehicle based at least in part on the second attribute; wherein determining the difference between the second position and the third position of the second vehicle is further based at least in part on the first score and the second score.

P: The one or more non-transitory computer-readable media of any of paragraphs F-O, wherein: the first attribute is based at least in part on a first deployment time of the first vehicle in the environment, and the second attribute is based at least in part on a second deployment time of the second vehicle in the environment.

Q: A method comprising: determining, by a first vehicle, a first position of the first vehicle and a second position of a second vehicle, the first vehicle and the second vehicle associated with a same fleet of vehicles; determining, by the first vehicle, a first attribute associated with the first vehicle navigating in an environment; receiving, by the first vehicle and from the second vehicle, a third position of the second vehicle in the environment and a second attribute associated with the second vehicle navigating in the environment; determining, by the first vehicle, a difference between the second position and the third position of the second vehicle; modifying, as a modified position, the first position of the first vehicle based at least in part on the difference; and controlling the first vehicle in the environment based at least in part on the modified position.

R: The method of paragraph Q, further comprising: determining a first weight for the second position of the second vehicle based at least in part on the first attribute; and determining a second weight for the third position of the second vehicle based at least in part on the second attribute, wherein: the second weight greater than the first weight, and modifying the first position of the first vehicle based at least in part on the first weight and the second weight.

S: The method of paragraph Q or R, further comprising: initiating, based at least in part on determining that the first vehicle and the second vehicle are associated with the same fleet of vehicles, a communication between the first vehicle and the second vehicle, wherein receiving the third position of the second vehicle is based at least in part on initiating the communication.

T: The method of any of paragraphs Q-S, further comprising: determining sensor data associated with one or more sensor associated with the first vehicle, wherein: the first position, the second position, and the first attribute are determined based on the sensor data, the third position is determined based on receiving a communication from the second vehicle, and the communication is initiated by one of: the first vehicle or the second vehicle based on a proximity between the first vehicle and the second vehicle being within a threshold distance.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
detecting, based at least in part on sensor data associated with a sensor of a first autonomous vehicle, a second autonomous vehicle in a vicinity of the first autonomous vehicle;
determining, by the first autonomous vehicle and based on the sensor data, a first pose of the first autonomous vehicle and a second pose of the second autonomous vehicle;
determining, by the first autonomous vehicle, a first time that the first autonomous vehicle navigated in an environment;
determining that the first autonomous vehicle and the second autonomous vehicle are associated with a same fleet of autonomous vehicles;
initiating, based at least in part on determining that the first autonomous vehicle and the second autonomous vehicle are associated with the same fleet of autonomous vehicles, a communication between the first autonomous vehicle and the second autonomous vehicle;
receiving, by the first autonomous vehicle and as part of the communication, a third pose of the second autonomous vehicle in the environment and a second time that the second autonomous vehicle navigated in the environment;
determining a first weight for the second pose of the second autonomous vehicle and a second weight for the third pose of the second autonomous vehicle, the second weight greater than the first weight;
modifying, as a modified pose, the first pose of the first autonomous vehicle based at least in part on the first weight and the second weight; and
controlling the first autonomous vehicle in the environment based at least in part on the modified pose.

2. The system of claim 1, the operations further comprising:
determining that the second time that the second autonomous vehicle navigated in the environment is less than the first time that the first autonomous vehicle navigated in the environment;
determining the first weight for the second pose of the second autonomous vehicle based at least in part on the first time that the first autonomous vehicle navigated in the environment; and
determining the second weight for the third pose of the second autonomous vehicle based at least in part on the second time that the second autonomous vehicle navigated in the environment,
wherein the second weight is greater than the first weight based at least in part on determining that the second time that the second autonomous vehicle navigated in the environment is less than the first time that the first autonomous vehicle navigated in the environment.

3. The system of claim 1, the operations further comprising:
receiving position data relative to a fixed reference system of the first autonomous vehicle,
wherein modifying the first pose is further based at least in part on the position data.

4. The system of claim 1, the operations further comprising:
determining that the first time of the first autonomous vehicle is above a time threshold; and
modifying a trajectory of the second autonomous vehicle to cause the second autonomous vehicle to navigate to within a threshold distance of the first autonomous vehicle,
wherein detecting the second autonomous vehicle is based at least in part on modifying the trajectory of the second autonomous vehicle.

5. The system of claim 1, the operations further comprising:
determining, based at least in part on the third pose in the communication, a difference between a first determination of the first autonomous vehicle and a second determination associated with the second autonomous vehicle; and
determining an alignment score for the sensor based at least in part on the difference.

6. One or more non transitory computer readable media storing instructions executable by one or more processors, wherein the instructions, when executed, cause the one or more processors to perform operations comprising:
determining, by a first vehicle, a first position of the first vehicle and a second position of a second vehicle, the first vehicle and the second vehicle associated with a same fleet of vehicles;
determining, by the first vehicle, a first attribute associated with the first vehicle navigating in an environment;
determining a first weight for the second position of the second vehicle based at least in part on the first attribute;
receiving, by the first vehicle and from the second vehicle, a third position of the second vehicle in the environment and a second attribute associated with the second vehicle navigating in the environment;
determining a second weight for the third position of the second vehicle based at least in part on the second attribute, wherein the second weight is greater than the first weight;
determining, by the first vehicle, a difference between the second position and the third position of the second vehicle;
modifying, as a modified position, the first position of the first vehicle based at least in part on the difference, the first weight, and the second weight; and
controlling the first vehicle in the environment based at least in part on the modified position.

7. The one or more non transitory computer readable media of claim 6, the operations further comprising:

initiating, based at least in part on determining that the first vehicle and the second vehicle are associated with the same fleet of vehicles, a communication between the first vehicle and the second vehicle, wherein receiving the third position of the second vehicle is based at least in part on initiating the communication.

8. The one or more non transitory computer readable media of claim 6, the operations further comprising:

determining sensor data associated with one or more sensor associated with the first vehicle, wherein:

the first position, the second position, and the first attribute are determined based on the sensor data, the third position is determined based on receiving a communication from the second vehicle, and the communication is initiated by one of: the first vehicle or the second vehicle based on a proximity between the first vehicle and the second vehicle being within a threshold distance.

9. The one or more non transitory computer readable media of claim 6, the operations further comprising:

receiving position data relative to a fixed reference system of the first vehicle, wherein modifying the first position is further based at least in part on the position data.

10. The one or more non transitory computer readable media of claim 6, the operations further comprising:

determining, based at least in part on the third position, a misalignment score between a first sensor of the first vehicle and a second sensor associated with the second vehicle; and modifying a parameter of the first sensor based at least in part on the misalignment score.

11. The one or more non transitory computer readable media of claim 6, wherein the difference is a first difference, and the operations further comprising:

receiving, by the first vehicle, velocity information of the second vehicle;

determining a second difference between a predicted velocity and the velocity information; and estimating a degradation of a sensor of the first vehicle based at least in part on the second difference.

12. The one or more non transitory computer readable media of claim 6, the operations further comprising:

determining a first score associated with the first vehicle based at least in part on the first attribute; and determining a second score associated with the second vehicle based at least in part on the second attribute;

wherein determining the difference between the second position and the third position of the second vehicle is further based at least in part on the first score and the second score.

13. A method comprising:

determining, by a first vehicle, a first position of the first vehicle and a second position of a second vehicle, the first vehicle and the second vehicle associated with a same fleet of vehicles;

determining, by the first vehicle, a first attribute associated with the first vehicle navigating in an environment, wherein the first attribute is a time period that the first vehicle navigated in the environment;

determining that the time period of the first vehicle is above a time threshold;

modifying a trajectory of the second vehicle to cause the second vehicle to navigate to within a threshold distance of the first vehicle;

receiving, by the first vehicle and from the second vehicle and based at least in part on modifying the trajectory of the second vehicle, a third position of the second vehicle in the environment and a second attribute associated with the second vehicle navigating in the environment;

determining, by the first vehicle, a difference between the second position and the third position of the second vehicle;

modifying, as a modified position, the first position of the first vehicle based at least in part on the difference; and controlling the first vehicle in the environment based at least in part on the modified position.

14. The method of claim 13, further comprising:

determining a first weight for the second position of the second vehicle based at least in part on the first attribute; and determining a second weight for the third position of the second vehicle based at least in part on the second attribute, wherein:

the second weight greater than the first weight, and modifying the first position of the first vehicle based at least in part on the first weight and the second weight.

15. The method of claim 13, further comprising:

initiating, based at least in part on determining that the first vehicle and the second vehicle are associated with the same fleet of vehicles, a communication between the first vehicle and the second vehicle, wherein receiving the third position of the second vehicle is based at least in part on initiating the communication.

16. The method of claim 13, further comprising:

determining sensor data associated with one or more sensor associated with the first vehicle, wherein:

the first position, the second position, and the first attribute are determined based on the sensor data, the third position is determined based on receiving a communication from the second vehicle, and the communication is initiated by one of: the first vehicle or the second vehicle based on a proximity between the first vehicle and the second vehicle being within the threshold distance.

17. A method comprising:

determining, by a first vehicle, a first position of the first vehicle and a second position of a second vehicle, the first vehicle and the second vehicle associated with a same fleet of vehicles;

determining, by the first vehicle, a first attribute associated with the first vehicle navigating in an environment, wherein the first attribute is a time that the first vehicle navigated in the environment;

determining that the time of the first vehicle is above a time threshold;

modifying a trajectory, a speed, or a location of the first vehicle based at least in part on determining that the time of the first vehicle is above the time threshold;

receiving, by the first vehicle and from the second vehicle, a third position of the second vehicle in the environment and a second attribute associated with the second vehicle navigating in the environment;

determining, by the first vehicle, a difference between the second position and the third position of the second vehicle;

modifying, as a modified position, the first position of the first vehicle based at least in part on the difference; and controlling the first vehicle in the environment based at least in part on the modified position.

18. A method comprising:

determining, by a first vehicle, a first position of the first vehicle and a second position of a second vehicle, the first vehicle and the second vehicle associated with a same fleet of vehicles;

determining, by the first vehicle, a first attribute associated with the first vehicle navigating in an environment, wherein the first attribute is based at least in part on a first deployment time of the first vehicle in the environment;

receiving, by the first vehicle and from the second vehicle, a third position of the second vehicle in the environment and a second attribute associated with the second vehicle navigating in the environment, wherein the second attribute is based at least in part on a second deployment time of the second vehicle in the environment;

determining, by the first vehicle, a difference between the second position and the third position of the second vehicle;

modifying, as a modified position, the first position of the first vehicle based at least in part on the difference; and controlling the first vehicle in the environment based at least in part on the modified position.

19. The method of claim 18, wherein the first vehicle or the second vehicle comprises an autonomous vehicle.

20. The method of claim 18, wherein the first position, the second position, or the first attribute are determined based at least in part on sensor data associated with a sensor.

* * * * *